(12) United States Patent
Gold et al.

(10) Patent No.: US 8,405,397 B2
(45) Date of Patent: Mar. 26, 2013

(54) METHOD FOR MITIGATING LEAKAGE CURRENTS

(75) Inventors: Randy Gold, Houston, TX (US); Stanislav Wilhelm Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 203 days.

(21) Appl. No.: 13/047,503

(22) Filed: Mar. 14, 2011

(65) Prior Publication Data

US 2011/0227580 A1 Sep. 22, 2011

Related U.S. Application Data

(60) Provisional application No. 61/315,187, filed on Mar. 18, 2010.

(51) Int. Cl.
*G01V 3/18* (2006.01)
(52) U.S. Cl. .......................... 324/366; 324/338
(58) Field of Classification Search ............ 324/368, 324/338
See application file for complete search history.

(56) References Cited

U.S. PATENT DOCUMENTS

| | | |
|---|---|---|
| 5,528,495 A | 6/1996 | Roscoe |
| 7,665,544 B2 | 2/2010 | Forgang et al. |
| 7,804,302 B2 | 9/2010 | Forgang et al. |
| 7,896,073 B2 | 3/2011 | Forgang et al. |
| 2006/0018404 A1 | 1/2006 | Schutz |
| 2008/0272789 A1 | 11/2008 | Martin et al. |
| 2009/0302854 A1 | 12/2009 | Forgang et al. |
| 2009/0306896 A1 | 12/2009 | Forgang et al. |
| 2010/0097068 A1 | 4/2010 | Itskovich et al. |

*Primary Examiner* — Reena Aurora
(74) *Attorney, Agent, or Firm* — Mossman Kumar & Tyler PC

(57) ABSTRACT

An apparatus and method for reducing an electric current leakage in a logging tool, particularly relating to reducing electric current leakage by altering a phase difference between a biasing element and an electric current produced by a first power source. The apparatus may include one or more measure electrodes for imparting electric current into a formation, a current meter, at least one current return electrode, a controller, and a biasing element. The method includes adjusting a phase angle difference between the current leaving the measure electrode and a biasing signal applied to the biasing element from a second power source to reduce the current leakage of the apparatus.

19 Claims, 5 Drawing Sheets

METHOD FOR MITIGATING LEAKAGE CURRENTS

CROSS-REFERENCES TO RELATED APPLICATIONS

This application claims priority from U.S. Provisional Patent Application Ser. No. 61/315,187, filed on 18 Mar. 2010, the disclosure of which is fully incorporated herein by reference in its entirety.

FIELD OF THE DISCLOSURE

This disclosure generally relates to exploration for hydrocarbons involving electrical investigations of a borehole penetrating an earth formation. More specifically, this disclosure relates to reducing electric current leakage during borehole investigations involving electric current injected into a wall of the borehole.

BACKGROUND OF THE DISCLOSURE

Electrical earth borehole logging is well known and various devices and various techniques have been described for this purpose. Broadly speaking, there are two categories of devices used in electrical logging devices. In the first category, a transmitter (such as a current electrode) is uses in conjunction with a diffuse return electrode (such as the tool body). A measured electric current flows in a circuit that connects a current source to the transmitter, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure belongs to the first category.

With tools in the first category, it is desirable for the current to penetrate the earth formation to at least a minimum desired depth before returning through the return electrode. One method of preventing early current return, and bypassing most or all of the earth formation, is to use a biasing element. A biasing element, which may be a metallic structure capable of carrying an electric potential, may be energized to a specified voltage so as to prevent an undesired electric current return. However, this biasing method is not perfect, and substantial amounts of the source current may travel into the biasing element (current leakage) rather than to the return electrode. This current leakage interferes with measurement of the resistive properties of the formation. This disclosure addresses mitigation of this current leakage.

SUMMARY OF THE DISCLOSURE

In aspects, the present disclosure is related to methods and apparatuses for reducing electric current leakage during borehole investigations involving electric current injected into a wall of the borehole.

One embodiment according to the present disclosure includes A method of conducting logging operations, the method comprising: reducing an electric current leakage of a logging tool in a borehole using a controller to alter a phase difference between an electric current from a first power source and a biasing signal applied to a biasing element from a second power source to reduce the electric current leakage.

Another embodiment according to the present disclosure includes An apparatus for reducing electric current leakage in a logging tool comprising: a carrier; a first power source disposed on the carrier; a biasing element disposed on the carrier operatively coupled to a second power source; a controller operatively coupled to the biasing element, wherein the controller is configured to cause the second power source to apply, in sequence: (i) a biasing voltage to the biasing element at a first phase angle and (ii) the biasing voltage to the biasing element at a second phase angle; and a current meter responsive to an electric current through the first power source.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electrical investigations of a borehole penetrating an earth formation. More specifically, this disclosure relates to reducing electric current leakage during borehole investigations involving electric current injected into a wall of the borehole.

Figure 1:
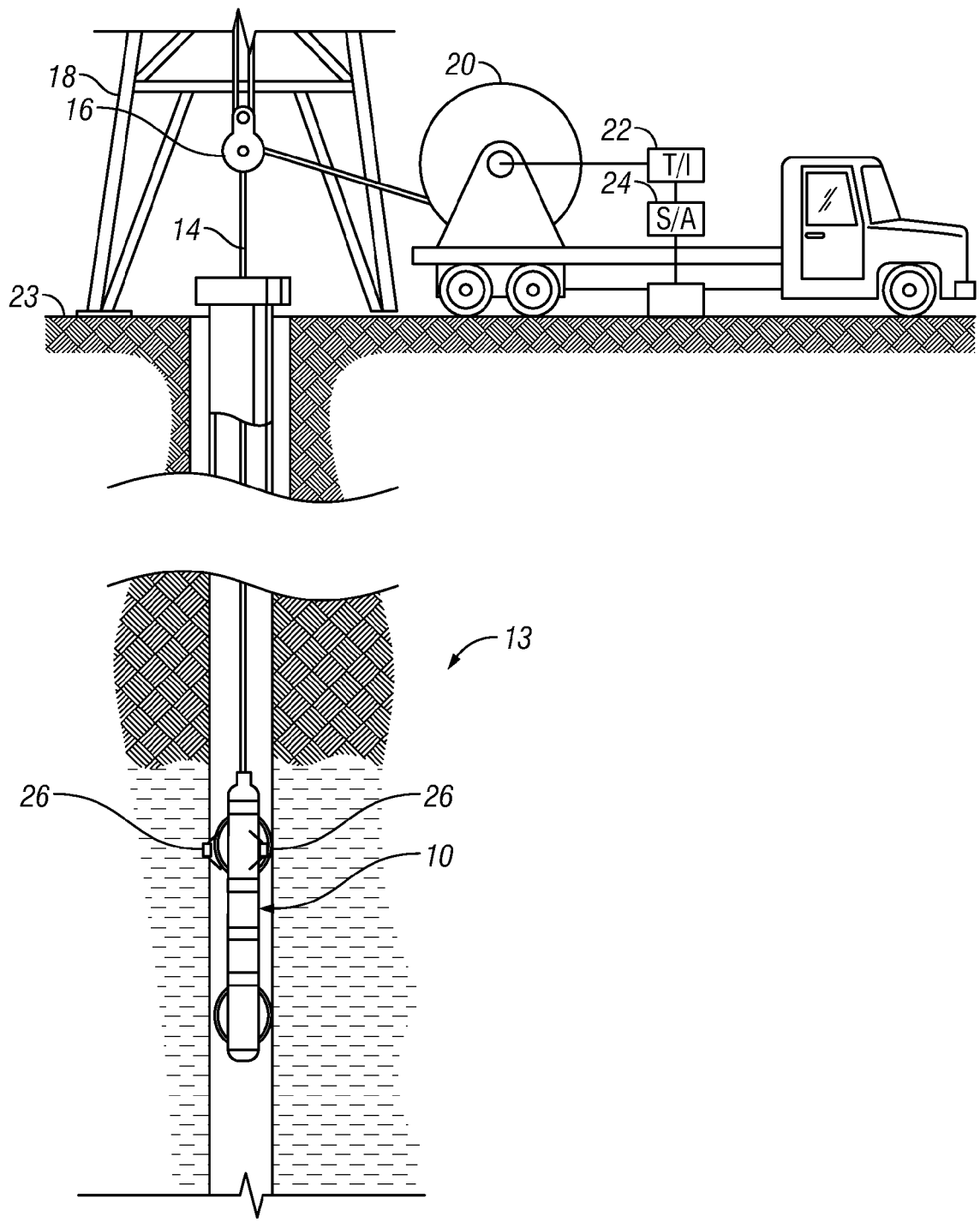
FIG. 1 shows a schematic of an imaging tool deployed in a wellbore along a drill string according to one embodiment of the present disclosure.

FIG. 1 shows an exemplary imaging tool 10 suspended in a borehole 12, which penetrates earth formations such as 13, from a carrier 14 that passes over a sheave 16 mounted on drilling rig 18. Carrier 14 may be rigid or non-rigid. Imaging tool 10 may be coupled or combined with additional tools. In this example, the tool 10 is raised and lowered by draw works 20. Electronic module 22, on the surface 23, transmits the required operating commands downhole and in return, receives information back which may be recorded on an archival storage medium of any desired type for concurrent or later processing. Herein, the term "information" may relate to raw data, processed data, or signals. The information may be transmitted in analog or digital form. Information processors such as a suitable computer 24, may be provided for performing data analysis in the field in real time or the recorded information may be sent to a processing center or both for post processing of the information. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.).

Imaging tool 10 may be in contact with earth formation 13 when performing various measurement operations. The point of contact may be a resistivity array 26 in contact with the earth formation 13. This resistivity array 26 may be retractable such that, when the resistivity array 26 is not in contact with the earth formation 13, the resistivity array 40 may still be in contact with wellbore drilling fluid 50 that resides within the borehole 12.

Figures 2A, 2B:
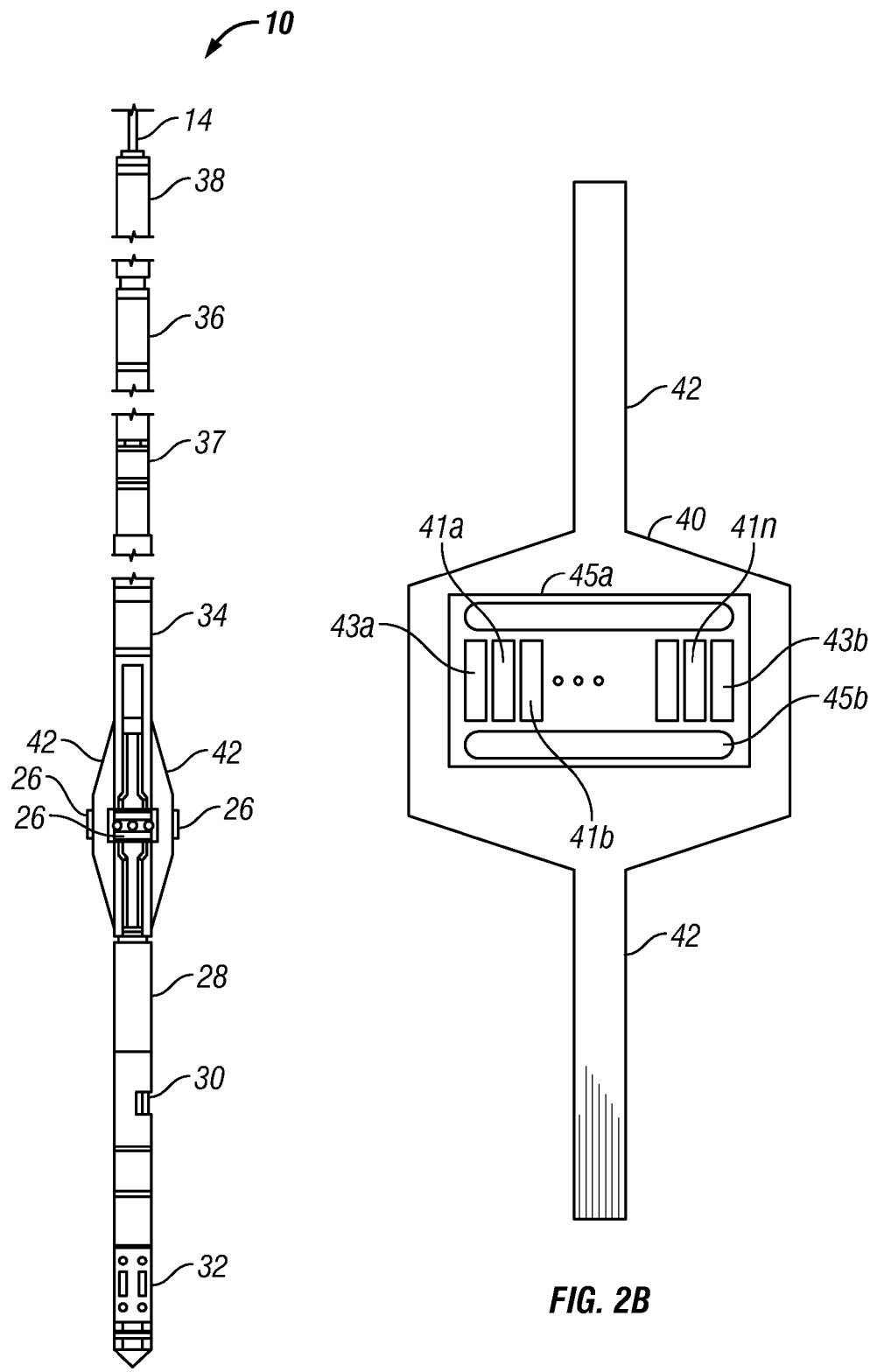
FIG. 2 shows a schematic close up of an imaging tool deployed in a wellbore according to one embodiment of the present disclosure.

FIG. 2A shows a schematic external view of an exemplary borehole sidewall imager system 10. The tool 10 comprising the imager system may include resistivity arrays 26 and, optionally, a mud cell 30 and a circumferential acoustic televiewer 32. The resistivity arrays 26 may be secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the information samples from the various components uphole to surface electronics 22 in a conventional manner. If acoustic information is acquired, they are preferably digitized, although in an alternate arrangement, the information may be retained in analog form for transmission to the surface where it is later digitized by surface electronics 22. Imaging tool 10 may also include a biasing element 70, which may have a voltage impressed upon it to influence the path that electric current may use while the resistivity arrays 26 are active. Biasing element 70 may be part of the exterior of the imaging tool 10 or located elsewhere along the carrier 14. In some embodiments, biasing element 70 may be part of or attached to mandrel 34.

Also shown in FIG. 2B are three resistivity arrays 26 (a fourth array is hidden in this view). Referring to FIGS. 2A and 2B, each array includes measure electrodes 41a, 41b, . . . 41n (collectively 41) for injecting electrical currents into the formation, return electrodes 43a, 43b (collectively 43) for horizontal return of the electrical currents from the measure electrodes and return electrodes 45a, 45b (collectively 45) for vertical return of the electrical currents from the measure electrodes. By convention, "vertical" refers to the direction along the axis of the borehole and "horizontal" refers to a plane perpendicular to the vertical. The measuring electrodes are preferably isolated from the electronics module by an isolator section such as 37 (FIG. 2A) that is preferably between 2'6" and 15' long.

Figure 3:
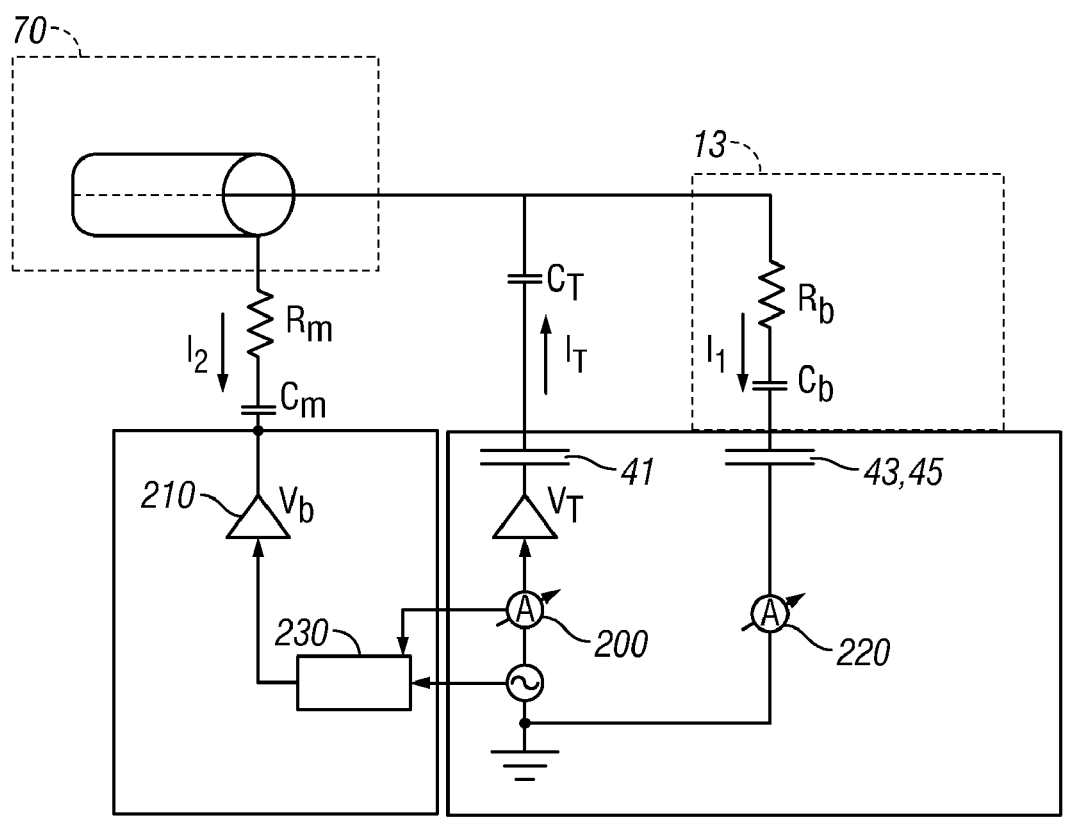
FIG. 3 shows an equivalent circuit diagram of the imaging tool according to the present disclosure.

FIG. 3 an equivalent circuit of one embodiment according to the disclosure. The gap (which will likely contain non-conductive drilling fluid) between the measure electrodes 41 and the borehole wall 12 is represented by capacitor $C_T$. The gap between the return electrodes 43, 45 and the borehole wall 12 is represented by capacitor $C_b$. The resistivity of the circuit from the measure electrodes 41 to the return electrodes 43, 45 through formation 13 is represented by resistor $R_b$. The capacitive coupling between the biasing element 70 and the formation 13 is represented by capacitor $C_m$. The resistivity to the current flowing from the biasing element 70 back to the current source 200 is represented by resistor $R_m$.

Measure electrodes 41 may be supplied with current from power source 200, and biasing element 70 may be supplied with voltage by power source 210. Power sources 200 and 210 may be a current source or a voltage source, or a combination of both. In some embodiments, the measure electrode(s) 41 and the biasing element 70 may receive power from the same power source. The magnitude of the current from power source 200 may be measured by current meter 220. A controller 230 may vary the phase difference between the current from power source 200 and the voltage supplied from power source 210 to biasing element 70. The placement of controller 230 and power source 210 in the imaging tool 10 is exemplary and illustrative only, as the controller 230 and/or the power source 210 may be located on the surface 23 or elsewhere disposed along the carrier 14 as long as controller and power source are operatively coupled to the biasing element 70. Some embodiments may include a phase lock circuit (not shown) between the power source 200 and power source 210 to correct for phase drift when the frequencies of the two power sources are not the same.

As described, the desired real component of the resistivity measurement is $R_b$, however, large impedance along the current path including $C_b$ and $R_b$ may significantly reduce signal current $I_1$. When $C_m$ is much larger than $C_b$, the leakage current $I_2$ draws most of the transmitter current $I_T$. However, the relationship between leakage current $I_2$ and transmitter current $I_T$ is affected by the phase difference between the voltage of biasing element 70 and transmitter current $I_T$. In fact, at phase differences where transmitter current $I_T$ is reduced, the proportion of leakage current $I_2$ relative to transmitter current $I_T$ is also reduced. Thus, adjusting the phase difference is a way of reducing leakage current and improving resistivity measurement.

Figure 4:
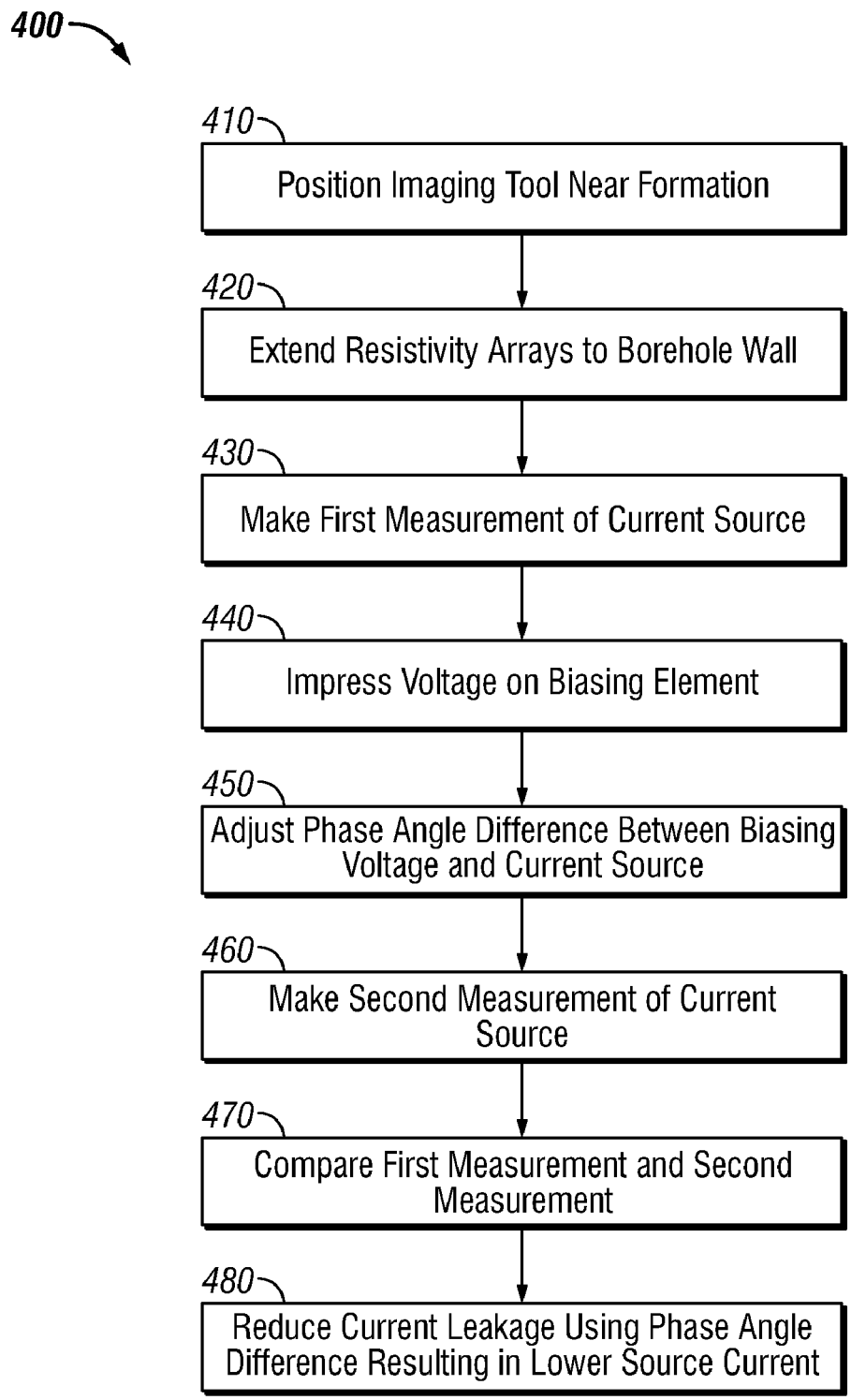
FIG. 4 shows a flow chart of a method for reducing the leakage current of an imaging tool according to one embodiment of the present disclosure.

FIG. 4 shows an exemplary method 400 according to one embodiment of the present disclosure. In method 400, an imaging tool 10 is positioned within a borehole 12 adjacent to a formation 13 in step 410. Then, in step 420, resistivity arrays 26 are extended to the borehole wall 12. In step 430, a first measurement of the current from the power source 200 is made by current meter 220 as the current is imparted to the borehole wall 12 though at least one measure electrode 41. In step 440, a voltage is impressed on a biasing element 70 by a power source 210 at a frequency that is the same or substantially the same as the frequency of the current from power source 200. When the frequencies of the signals applied to the measure electrode(s) 41 and biasing element 70 are about the same (within 0.1%), then the phase correction may depend on the frequencies. Typically, phase correction may range from approximately 1 to 2 degrees at 5 MHz to approximately 12 to 15 degrees at 40 MHz. Phase correction may be performed when frequencies of the signals have a greater separation that about 0.1% using common techniques known to one of skill in the art. In step 450, controller 230 adjusts the phase angle difference between the biasing voltage and the power source 200. In step 460, a second current measurement is performed by current meter 220. In step 470, controller 230 compares the first measurement with the second measurement. Finally, in step 480, the controller 230 reduces leakage current by causing the power source 210 to supply the biasing element 70 with a biasing voltage having a phase angle difference resulting in a lower transmitter current. Some or all of steps 420-

480 may be repeated to reduce the magnitude of the current as desired down to the lowest practicable magnitude for the circuit. In the event that the imaging tool 10 uses multiple measure electrodes, method 400 may be performed for each individually (as each measure electrode will have its own transmitter current). This method may be performed on multiple measure electrodes sequentially or simultaneously.

Figure 5A:
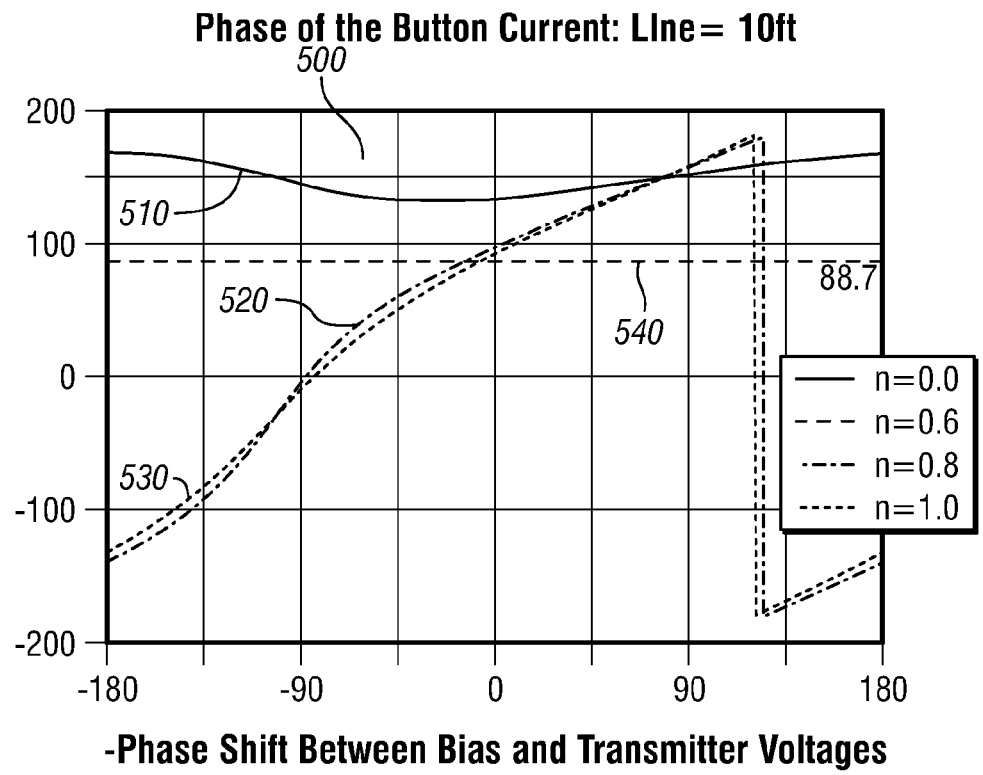
FIG. 5A graphically illustrates the effects of voltage biasing on return current across a range of phase angle differences using one embodiment according to the present disclosure.

FIG. 5A shows the current leakage behavior across a range of phase differences between the power source and the biasing voltage. Curve 500 indicates the phase angle of the return current when no biasing voltage is applied. Curve 510 indicates the phase angle of the return current when the biasing voltage is set the 100% of that of the power source. Curve 520 indicates the phase angle of the return current when the biasing voltage is set to 60% of that of the power source. Finally, curve 530 indicates the phase angle of the return current when the biasing voltage is set to 80% of that of the power source. Curve 540 indicates the phase angle of the return current if there were no current leakage present and no biasing voltage. The effects of these variations in the phase angle and biasing voltage on transmitter current magnitude are shown in FIG. 5B.

Figure 5B:
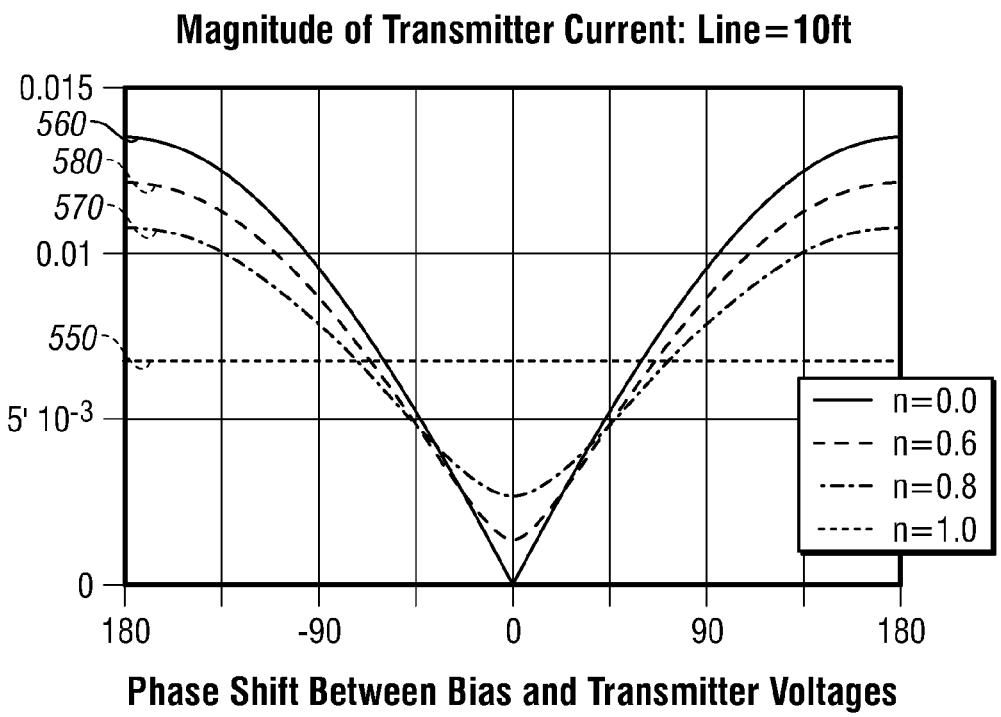
FIG. 5B graphically illustrates the effects of voltage biasing on the magnitude of transmitter current across a range of phase angle differences using one embodiment according to the present disclosure.

In FIG. 5B, curve 550 indicates the magnitude of the transmitter current when no biasing voltage is applied. Curve 560 indicates the magnitude of the transmitter current when 100% biasing voltage is applied. Notice that no biasing voltage results in no measurable improvement, however, biasing voltage set to 100% of that of the power source shows a distinct drop in the magnitude of the transmitter current at a phase difference of zero. This result is illustrative only, as it may be possible for minimum of magnitude of the transmitter current to occur at a phase difference other than zero. It is also possible that the desired magnitude of the transmitter current may be a reduced value that is not zero or a local minimum or maximum. Curves 570 and 580 show similar drops when biasing voltages of 60% and 80% of that of the power source, respectively, are applied. It may be desired to reduce the magnitude of the current by adjusting the phase angle difference but not lower the magnitude to zero. As can be seen in curves 570 and 580, one way of achieving this may be to adjust the biasing voltage to from about 60% to about 80% of the voltage of the power source.

Implicit in the processing of the information is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

We claim:

1. A method of conducting logging operations, the method comprising:
    reducing an electric current leakage of a logging tool in a borehole by altering a phase difference between an electric current from a first power source and a biasing signal applied to a biasing element from a second power source to reduce the electric current leakage.

2. The method of claim 1, further comprising:
    positioning the logging tool in the borehole in the earth formation; and
    energizing the first power source to impart the electric current into the earth formation.

3. The method of claim 1, further comprising using, for the logging tool, the logging tool that includes the biasing element and the first power source.

4. The method of claim 3, further comprising generating the biasing voltage using a second power source controlled by the controller.

5. The method of claim 4, further comprising using, for the first power source, a power source that has a frequency that is substantially the same as a frequency of the second power source.

6. The method of claim 3, further comprising using, for the logging tool, a logging tool that includes a plurality of return electrodes.

7. The method of claim 1, further comprising using, for the first power source, a power source that includes an electrode.

8. The method of claim 1, wherein the first power source has a voltage amplitude, the method further comprising using a biasing voltage that has an amplitude that is from about 60% to about 80% of the first power source voltage amplitude.

9. The method of claim 1, further comprising using, for the biasing signal, one of: a biasing voltage and a biasing current.

10. The method of claim 1, further comprising using, for the first power source, one of: a current source and a voltage source.

11. An apparatus for conducting logging operations, the apparatus comprising:
    a carrier;
    a first power source disposed on the carrier;
    a biasing element disposed on the carrier operatively coupled to a second power source;
    a controller operatively coupled to the biasing element, wherein the controller is configured to cause the second power source to apply, in sequence: (i) a biasing voltage to the biasing element at a first phase angle and (ii) the biasing voltage to the biasing element at a second phase angle; and
    a current meter responsive to an electric current through the first power source.

12. The apparatus of claim 11, further comprising:
    a phase lock circuit between the first power source and the second power source configured to maintain synchronization of the phase of the first power source and the phase of the second power source.

13. The apparatus of claim 11, wherein the carrier is one of: (i) a wireline, and (ii) a drilling tubular.

14. The apparatus of claim 11, further comprising:
    a plurality of return electrodes disposed on the carrier and configured to receive a portion of the electric current from the first power source.

15. The apparatus of claim 11, wherein the first power source includes an electrode.

16. The apparatus of claim 11, wherein the first power source has a voltage amplitude, and the biasing voltage has a voltage amplitude that is from about 60% to about 80% of the first power source voltage amplitude.

17. The apparatus of claim 11, wherein the response of the current meter includes a measurement of the magnitude of the electric current.

18. The apparatus of claim 11, wherein the biasing signal is one of: a biasing voltage and a biasing current.

19. The apparatus of claim 11, wherein the first power source is one of: a current source and a voltage source.

* * * * *